(12) United States Patent
Miyamoto

(10) Patent No.: US 8,279,474 B2
(45) Date of Patent: Oct. 2, 2012

(54) PRINTING SYSTEM, IMAGE FORMING APPARATUS, PULL PRINTING METHOD, PULL PRINTING PROGRAM EMBODIED ON COMPUTER READABLE MEDIUM

(75) Inventor: Hirohisa Miyamoto, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 848 days.

(21) Appl. No.: 12/408,579

(22) Filed: Mar. 20, 2009

(65) Prior Publication Data

US 2009/0310172 A1   Dec. 17, 2009

(30) Foreign Application Priority Data

Jun. 16, 2008   (JP) .................................. 2008-156412

(51) Int. Cl.
*G06F 15/00* (2006.01)
*G06F 3/12* (2006.01)
*G06K 1/00* (2006.01)
*G06K 15/00* (2006.01)

(52) U.S. Cl. ...................................... 358/1.15; 358/1.14
(58) Field of Classification Search .......................... None
See application file for complete search history.

(56) References Cited

U.S. PATENT DOCUMENTS 7,286,250 B2 * 10/2007 Kujirai et al. ................. 358/1.15
7,586,635 B2 *  9/2009 Maeda et al. ................. 358/1.15
2007/0081186 A1   4/2007 Numata
2007/0146778 A1   6/2007 Kitagata et al.
2007/0216935 A1   9/2007 Osamura et al.

FOREIGN PATENT DOCUMENTS

| JP | 2003-125155 | 4/2003 |
| JP | 2007-105937 | 4/2007 |
| JP | 2007-135047 | 5/2007 |
| JP | 2007-158867 | 6/2007 |
| JP | 2007-200284 | 8/2007 |
| JP | 2007-245627 | 9/2007 |
| JP | 2008-077355 | 4/2008 |

OTHER PUBLICATIONS

Japanese Office Action directed at JP-2008-156412 mailed May 25, 2010; 8 pages.

* cited by examiner

*Primary Examiner* — Douglas Tran
(74) *Attorney, Agent, or Firm* — Morrison & Foerster LLP

(57) ABSTRACT

In order to reduce the number of times of authentication when printing data stored in a server is printed, an MFP includes: a printing data receiving portion to receive printing data from a server; a job executing portion to execute a job; a user authenticating portion; a job generating portion to generate a reserved job to form an image of printing data associated with the authenticated user; a suspending portion to temporarily prohibit the reserved job from being executed; a job identification information issuing portion to issue job identification information; a transmission demanding portion to transmit to the printing server a printing data transmission demand that demands transmission of the printing data and contains the job identification information; and a releasing portion to release the prohibition of execution of the reserved job when the printing data received in response to transmission of the printing data transmission demand is received together with the same job identification information as the reserved job.

13 Claims, 12 Drawing Sheets

FIG. 6

SELECT THE DOCUMENT TO Pull Print

SELECT THE DOCUMENT TO PRINT

| REGISTRATION TIME △▽ | REGISTRATION SOURCE | DOCUMENT NAME |
|---|---|---|
| 16:10 | e000001 | SCREEN SPECIFICATION |
| 05/17 | 1234567890012 | 12345678901234567 8 |
| 05/17 | 1234567890012 | 12345678901234567 8 |
| 05/16 | 1234567890012 | 12345678901234567 8 |
| 05/03 | 1234567890012 | 12345678901234567 8 |
| 01/02 | 1234567890012 | 12345678901234567 8 |

1/2  ⇦  ⇨

SELECT ALL

RESET

DISPLAY IMAGE

F I G. 7

| EXECUTION ORDER | JOB IDENTIFICATION INFORMATION | TYPE | REGISTRATION SOURCE | STATUS |
|---|---|---|---|---|
| 1 | P0001 | NORMAL | USER A | EXECUTING |
| 2 | P0002 | NORMAL | USER C | WAITING FOR PRINTING |
| 3 | S0001 | NORMAL | USER D | WAITING FOR TRANSMISSION |
| 4 | C0001 | NORMAL | USER X | WAITING FOR PRINTING |
| 5 | P0003 | RESERVED | USER Y | HOLDING |
| 6 | S0002 | NORMAL | USER W | WAITING FOR TRANSMISSION |
| 7 | P0004 | RESERVED | USER Z | HOLDING |
| 8 | F0001 | NORMAL | USER E | WAITING FOR TRANSMISSION |
| 9 | P0005 | NORMAL | USER B | WAITING FOR PRINTING |
| 10 | : | : | : | : |
| 11 | : | : | : | : |
| 12 | : | : | : | : |
|  |  |  |  |  |
|  |  |  |  |  |

PRINTING SYSTEM, IMAGE FORMING APPARATUS, PULL PRINTING METHOD, PULL PRINTING PROGRAM EMBODIED ON COMPUTER READABLE MEDIUM

This application is based on Japanese Patent Application No. 2008-156412 filed with Japan Patent Office on Jun. 16, 2008, the entire content of which is hereby incorporated by reference.

BACKGROUND OF THE INVENTION

1. Field of the Invention

The present invention relates to a printing system, an image forming apparatus, a pull printing method, and a pull printing program. More particularly, the invention relates to a printing system including a printing server and an image forming apparatus for pull printing print data stored in the printing server, the image forming apparatus, a pull printing method executed at the image forming apparatus, and a pull printing program executed at the image forming apparatus.

2. Description of the Related Art

A known printing method generally referred to as pull printing involves storing printing data in a printing server and causing an image forming apparatus represented by an MFP (Multi Function Peripheral) to form an image of the printing data. In order to secure confidentiality, the pull printing has such a mechanism that the printing data is printed only from an instruction by a user authenticated at the printing server.

For example, Japanese Laid-Open Publication No. 2007-158867 describes an image processing apparatus wherein the image processing apparatus transmits user authentication information to a file server that in turn transmits the received user authentication information to an authentication server, and when the authentication server authenticates the information, the file server transmits image data to the image processing apparatus. However, the conventional image processing apparatus cannot receive image data unless user authentication information is transmitted to the file server. This creates the problem of having to input user authentication information every time image data is processed. In addition, the file server does not transmit the image data unless the authentication by the authentication server is successful, thereby creating the problem of necessitating an authentication by the authentication server every time the image processing apparatus makes a transmission demand of image data.

Japanese Laid-Open Publication No. 2007-245627 describes an image forming apparatus including: an authentication portion to authenticate a regular user; a ticket generating portion to generate a job execution ticket containing permission conditions upon which execution of a job is permitted; a data acquiring portion to output to a network-connected server device the job execution ticket and an acquisition demand of data selected by the regular user who has logged in after the authentication; and a control portion to, upon receipt of data attached with a job execution ticket within a predetermined elapse of time from log-out of the regular user, permit processing of the data in accordance with the above permission conditions even after the regular user has logged out. In receiving data from the server device, the image forming apparatus has to generate and transmit a job execution ticket, and further, retain the job execution ticket until receipt of data and, when receiving the data, compare the retained job execution ticket with a received one. This creates the problem of involving special processing for the generation, transmission, retention, and comparison of job execution ticket.

SUMMARY OF THE INVENTION

The present invention is made to solve the aforementioned problems. An object of the present invention is to provide a printing system with a reduced number of times of authentication when printing data stored in the server is printed.

Another object of the present invention is to provide an image forming apparatus with a reduced number of times of authentication when printing data stored in the server is printed.

Another object of the present invention is to provide a printing method with a reduced number of times of authentication when printing data stored in the server is printed.

Another object of the present invention is to provide a printing program with a reduced number of times of authentication when printing data stored in the server is printed.

In order to achieve the aforementioned objects, a printing system according to an aspect of the present invention includes an image forming apparatus and a printing server, and the image forming apparatus includes: a printing data receiving portion to receive printing data from the printing server; a job executing portion to execute a job to form an image of the received printing data; a user authenticating portion to authenticate a user; a job generating portion to generate a reserved job to form an image of printing data associated with the authenticated user; a suspending portion to temporarily prohibit the job executing portion from executing the reserved job; a job identification information issuing portion to issue job identification information for identifying the generated reserved job; a transmission demanding portion to transmit to the printing server a printing data transmission demand for demanding transmission of the printing data associated with the authenticated user, the printing data transmission demand containing the job identification information; and a releasing portion to release the prohibition of execution of the reserved job by the job executing portion when the printing data received from the printing server in response to transmission of the printing data transmission demand is received together with the same job identification information as the reserved job. The printing server includes: a printing data storing portion to, upon receipt of the printing data and user identification information for identifying the user, store the printing data in association with the user identification information; and a printing data transmitting portion to, upon receipt of the printing data transmission demand from the image forming apparatus, transmit to the image forming apparatus a piece of printing data among stored printing data, the piece of printing data being associated with printing data identification information contained in the printing data transmission demand and transmitted together with the job identification information contained in the printing data transmission demand.

According to another aspect of the present invention, an image forming apparatus includes: a printing data receiving portion to receive printing data from a server; a job executing portion to execute a job to form an image of the received printing data; a user authenticating portion to authenticate a user; a job generating portion to generate a reserved job to form an image of printing data associated with the authenticated user; a suspending portion to temporarily prohibit the job executing portion from executing the reserved job; a job identification information issuing portion to issue job identification information for identifying the generated reserved job; a transmission demanding portion to transmit to the server a printing data transmission demand for demanding transmission of the printing data associated with the authenticated user, the printing data transmission demand containing the job identification information; and a releasing portion to release the prohibition of execution of the reserved job by the job executing portion when the printing data received from the server in response to transmission of the printing data transmission demand is received together with the same job identification information as the reserved job.

According to another aspect of the present invention, a printing method includes: receiving printing data from a server; authenticating a user; generating a reserved job to form an image of printing data associated with the authenticated user; temporarily prohibiting the reserved job from being executed; issuing job identification information for identifying the generated reserved job; transmitting to the server a printing data transmission demand for demanding transmission of the printing data associated with the authenticated user, the printing data transmission demand containing the job identification information; and releasing the prohibition of execution of the reserved job temporarily prohibited from being executed when the printing data received from the server in response to transmission of the printing data transmission demand is received together with the same job identification information as the reserved job.

According to another aspect of the present invention, a printing program embodied on a computer readable medium causes a computer to execute steps including: receiving printing data from a server; authenticating a user; generating a reserved job to form an image of printing data associated with the authenticated user; temporarily prohibiting the reserved job from being executed; issuing job identification information for identifying the generated reserved job; transmitting to the server a printing data transmission demand for demanding transmission of the printing data associated with the authenticated user, the printing data transmission demand containing the job identification information; and releasing the prohibition of execution of the reserved job temporarily prohibited from being executed when the printing data received from the server in response to transmission of the printing data transmission demand is received together with the same job identification information as the reserved job.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing an example of a list screen.
FIG. 7 is a diagram showing an example of a job list.

DESCRIPTION OF THE PREFERRED EMBODIMENTS

Figure 1:
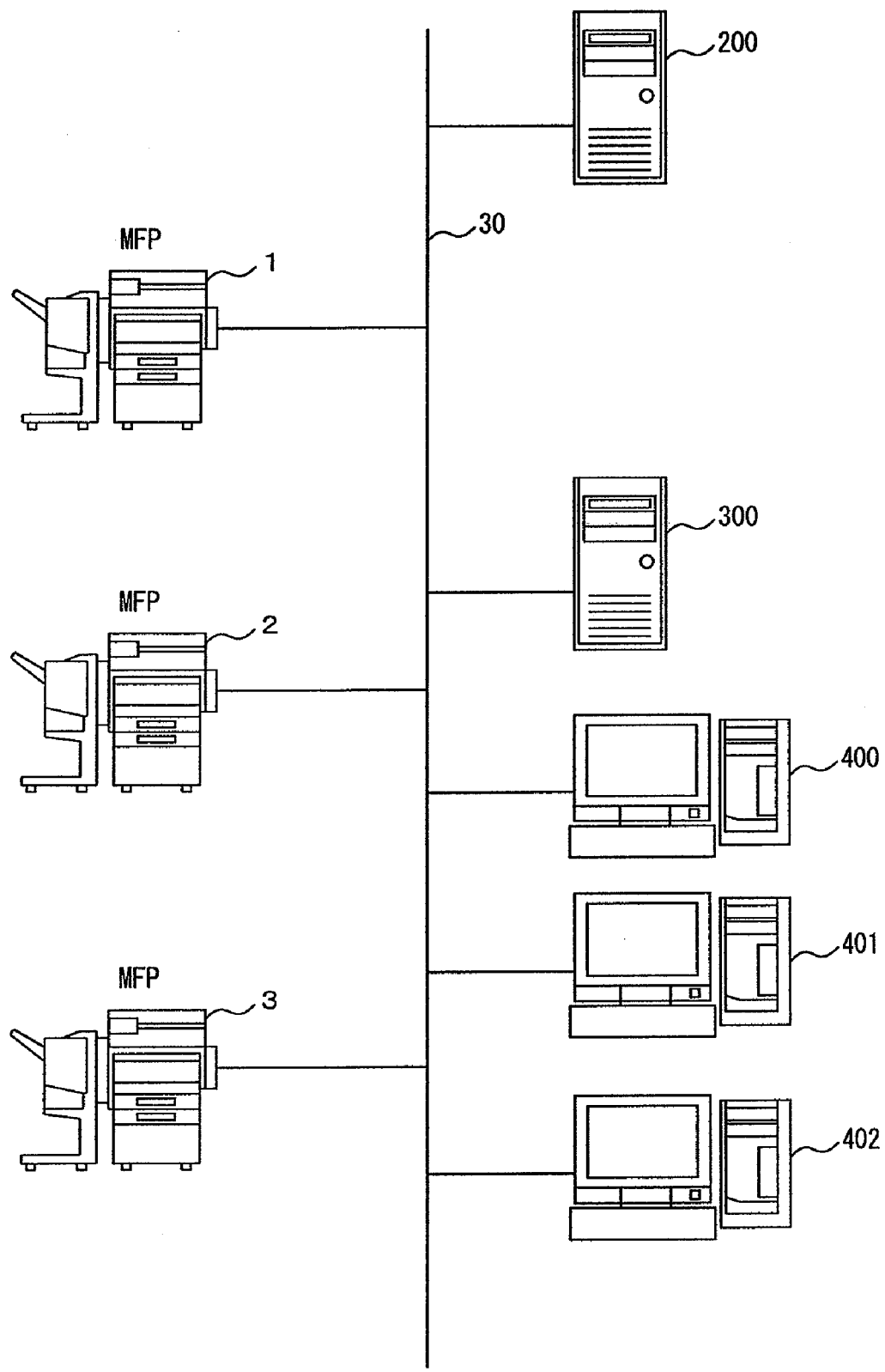
FIG. 1 is a schematic diagram of a printing system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 is a schematic diagram of a printing system according to an embodiment of the present invention. Referring to FIG. 1, the printing system includes multi-function peripherals (hereinafter referred to as MFPs) 1 to 3 that function as image forming apparatuses, a printing server 200, an authentication server 300, and personal computers (hereinafter referred to as PCs) 400 to 402, all of which are connected to a network 30. While the figure shows an example where three MFPs (multi-function peripherals) 1 to 3 are connected to network 30, the number of the MFPs is not limited to three insofar as the number is one or more. Instead of MFPs 1 to 3, any other apparatuses provided with the image forming function may be used such as facsimiles and printers. Network 30 is a local area network (LAN) and the form of connection thereof can be either wire or radio. Also, network 30 is not limited to LAN but can be a wide area network (WAN), a public switched telephone network (PSTN), or the Internet.

While MFPs 1 to 3 may have the same or mutually different functions, they basically have at least any of an image reading function to read a document and output image data, an image processing function to process image data, an image forming function to form an image onto a sheet of paper or the like based on the image data, a finishing function to carry out punching, sorting, and the like to an image-bearing sheet, and a facsimile transmitting/receiving function. While the functions of MFPs 1 to 3 may not be the same, description will be made of the case where MFP 1 possesses a function that at least one of MFPs 2 and 3 possesses.

PCs 400 to 402, printing server 200, and authentication server 300 are usual computers. The printing system according to this embodiment executes what is called pull printing; printing data generated at PCs 400 to 402 is temporarily stored in printing server 200 and printed at any one of MFPs 1 to 3. The functions of PCs 400 to 402, printing server 200, and authentication server 300 in the case of executing pull printing will be schematically described. It should be noted that printing server 200 may also serve as authentication server 300, in which case authentication server 300 is not necessary.

PCs 400 to 402 each are used by a usual user and execute various kinds of processing by executing application programs. The various kinds of processing include log-in processing for identifying a user, and printing processing for generating printing data and transmitting it to printing server 200. In this embodiment, each of PCs 400 to 402, when executing the printing processing after executing the log-in processing, transmits to printing server 200 a pair of printing data and user identification information for identifying a corresponding user. Printing server 200, upon receipt of the pair of user identification information and printing data from any of PCs 400 to 402, associates them with each other and stores them in an HDD. It should be noted that PCs 400 to 402 may transmit a pair of printing data and user identification information about a user (of a destination) designated by the actual user, instead of the user identification information about the actual user itself.

Authentication server 300 executes processing for authenticating the users of MFPs 1 to 3. Authentication server 300 stores user data containing authentication information allotted to each user. Upon receipt of authentication information from any of MFPs 1 to 3, authentication server 300 compares the authentication information with user data stored in advance. When the authentication information and the user data agree, authentication server 300 transmits in return an authentication result indicating a successful authentication, while when they do not agree, authentication server 300 transmits in return an authentication result indicating a failed authentication. The authentication information contains a pair of a password and user identification information for identifying a user.

Each of MFPs 1 to 3, when a corresponding user instructs printing of printing data, transmits a transmission demand of the printing data to the printing server and prints the printing data received from the printing server. Printing server 200, upon receipt of a printing data transmission demand from any of MFPs 1 to 3, transmits the printing data to one of MFPs 1 to 3 that has transmitted the printing data transmission demand.

In this embodiment, printing data generated at any of PCs 400 to 402 is associated with user identification information and stored in printing server 200. When the user indicated by the user identification information associated with the printing data operates any of MFPs 1 to 3, the printing data is output from the MFP, among MFPs 1 to 3, that is operated by the user on condition that the user is authenticated by authentication server 300.

While in this embodiment description is made of the example where user identification information and printing data are associated with each other and stored in printing server 200, it is also possible that PCs 400 to 402 set a printing condition to be transmitted to printing server 200 together with the printing data, and printing server 200 stores the user identification information, the printing data, and the printing condition while associating them with each other. In this case, a pair of the printing data and the printing condition is referred to as a printing job, and any of MFPs 1 to 3 receives this printing job from printing server 200 and executes the printing job, thereby printing it in accordance with the printing condition.

Figure 2:
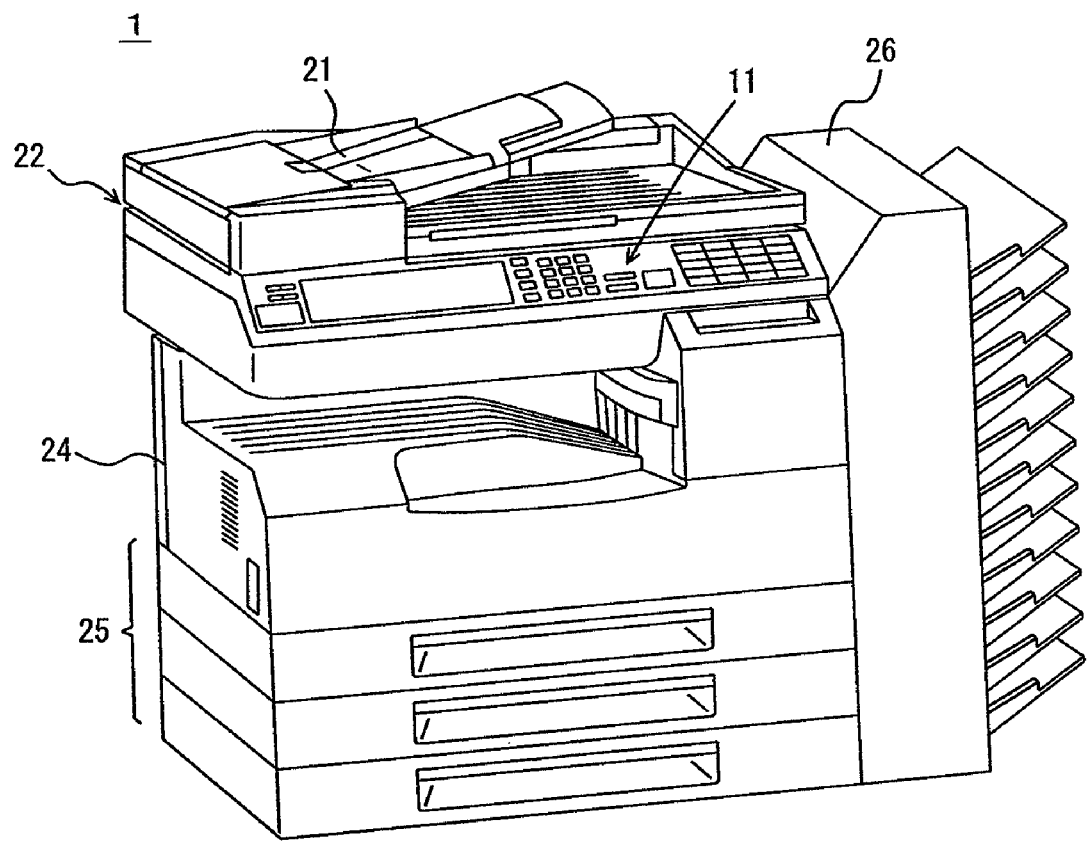
FIG. 2 is a perspective view of an MFP.

FIG. 2 is a perspective view of an MFP. Referring to FIG. 2, MFP 1 includes an automatic document feeder (ADF) 21, an image reading portion 22, an image forming portion 24, a paper feeding portion 25, and a finishing portion 26. MFP 1 also includes, on top thereof, an operation panel 11 used as a user interface.

Figure 3:
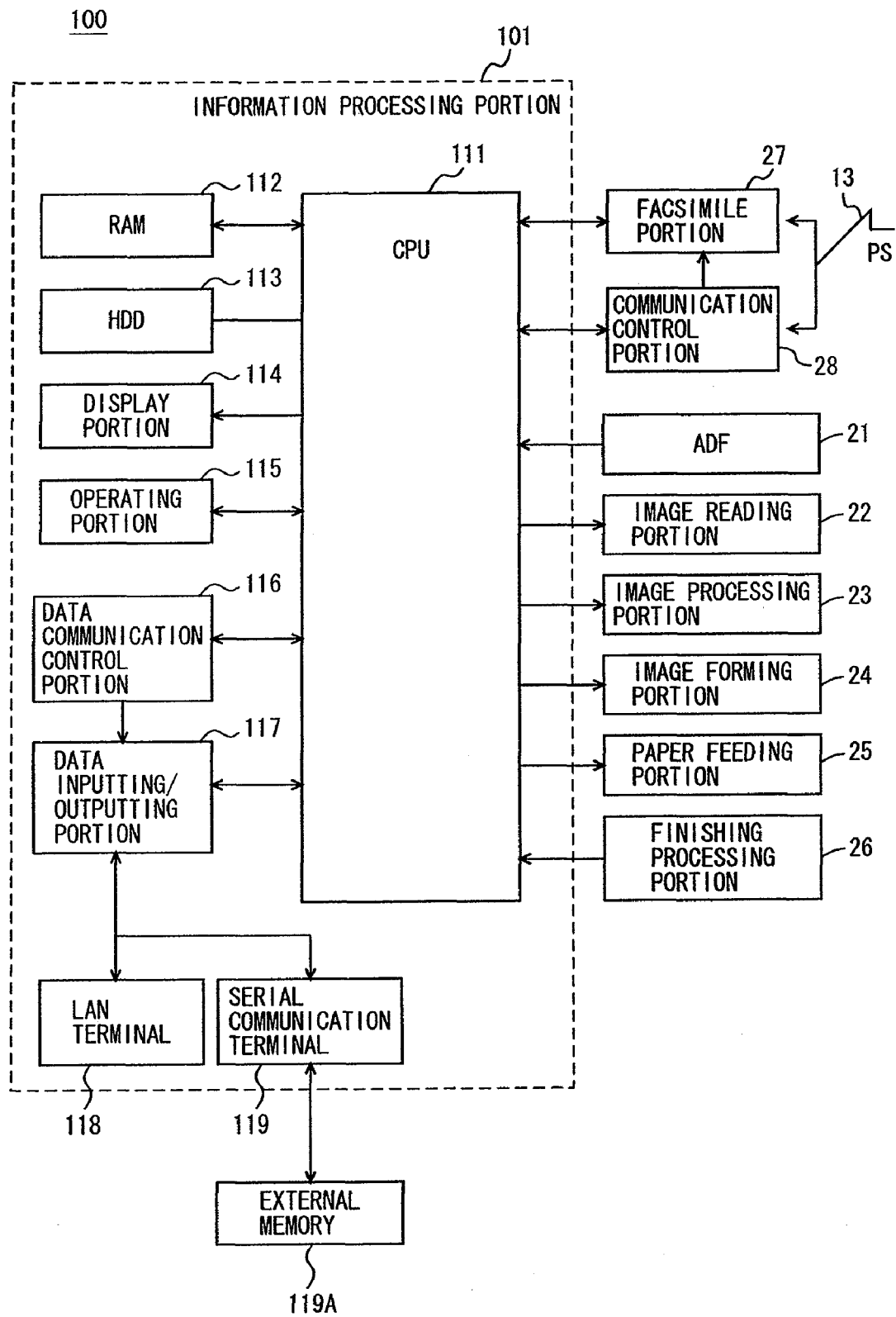
FIG. 3 is a block diagram showing an example of the hardware structure of the MFP.

FIG. 3 is a block diagram showing an example of the hardware structure of the MFP. Referring to FIG. 3, MFP 1 includes an information processing portion 101, a facsimile portion 27, a communication control portion 28, ADF 21, image reading portion 22, an image processing portion 23, image forming portion 24, paper feeding portion 25, and finishing processing portion 26. Information processing portion 101 includes a central processing unit (CPU) 111, a RAM (Random Access Memory) 112 used as a working area for CPU 111, a hard disk drive (HDD) 113 that stores data in a nonvolatile manner, a display portion 114, an operating portion 115, a data communication control portion 116, and a data inputting/outputting portion 117. CPU 111 is connected to data inputting/outputting portion 117, data communication control portion 116, operating portion 115, display portion 114, HDD 113, and RAM 112 in order to generally control information processing portion 101. CPU 111 is connected to facsimile portion 27, communication control portion 28, ADF 21, image reading portion 22, image processing portion 23, image forming portion 24, paper feeding portion 25, and finishing processing portion 26 in order to generally control MFP 1.

ADF 21 handles a plurality of sheets placed on a document tray and conveys them to image reading portion 22 on a one-by-one basis. In order to cause image reading portion 22 to read text on both sides of a sheet, ADF 21 conveys the sheet to image reading portion 22 to cause it to read one side of the sheet, and then turns over the sheet and conveys it again to image reading portion 22 to cause it to read the other side of the sheet. Image reading portion 22 acquires image data by optically reading image information such as photographs, characters, and pictures from the sheet. Image forming portion 24, upon input of the image data, prints an image onto a sheet of paper or the like based on the image data.

Paper feeding portion 25 has a plurality of sheet feeding trays and supplies to image forming portion 24 sheets stored in a designated sheet feeding tray on a one-by-one basis. Each of the sheet feeding trays stores sheets of a size selected from a plurality of sizes in an orientation selected from a plurality of orientations.

Finishing portion 26 discharges image-bearing sheets. Finishing portion 26 has a plurality of sheet discharge trays and includes a sorting portion, a punching portion, and a stapling portion. The sorting portion sorts a plurality of image-bearing sheets to be output to the plurality of sheet discharge trays. The punching portion punches holes in sheets. The stapling portion carries out stapling to fasten image-bearing sheets together.

Image processing portion 23 is controlled by CPU 111 and carries out image processing of image data based on an instruction from CPU 111. The image data includes image data of document read by and output from image reading portion 22, image data received by data inputting/outputting portion 117 from printing server 200 or either of the other MFPs 2 and 3, and image data stored in HDD 113. Examples of the image processing include enlargement processing for enlarging images, reduction processing for reducing images, synthesis processing for synthesizing a plurality of images into one image, and turning processing for turning an image to change the orientation thereof.

Display portion 114 is a display device such as a liquid crystal display (LCD) and an organic ELD (Electro Luminescence Display), and displays an instruction menu for users, information about acquired image data, and the like. Operating portion 115 includes a plurality of keys and accepts input of various instructions, characters, and numbers made by users' operations corresponding to the keys. Operating portion 115 further includes a touch panel provided on display portion 114. Display portion 114 and operating portion 115 constitute operation panel 11.

Data communication control portion 116 is connected to data inputting/outputting portion 117. Data communication control portion 116 controls data inputting/outputting portion 117 in accordance with an instruction from CPU 111 in order to transmit/receive data to/from external appliances connected to data inputting/outputting portion 117. Data inputting/outputting portion 117 includes a LAN terminal 118 serving as an interface for communication according to a communication protocol such as TCP (Transmission Control Protocol) and FTP (File Transfer Protocol), and a serial communication terminal 119.

When a LAN cable is connected to LAN terminal 118 for connection to network 30, data communication control portion 116 controls data inputting/outputting portion 117 in order to communicate with printing server 200, authentication server 300, MFPs 2 and 3, and PCs 400 to 402, which are connected to data communication control portion 116 through LAN terminal 118.

When an appliance is connected to serial communication terminal 119, data communication control portion 116 controls data inputting/outputting portion 117 in order to input/output data through communication with the connected appliance. To serial communication terminal 119, an external memory 119A mounting therein a flash memory is connectable. External memory 119A stores a pull printing program described later, and CPU 111 controls data communication control portion 116 in order to read the pull printing program from external memory 119A, store the read pull printing program in RAM 112, and execute the pull printing program.

The recording media that stores the pull printing program is not limited to external memory 119A and can also be a flexible disk, a cassette tape, an optical disk (CD-ROM (Compact Disc-Read Only Memory)/MO (Magnetic Optical Disc)/MD (Mini Disc)/DVD (Digital Versatile Disc)), an IC card, an optical card, and a semiconductor memory such as a masked ROM, an EPROM (Erasable Programmable ROM), an EEPROM (Electronically EPROM). It is also possible that CPU 111 downloads a pull printing program from printing server 200 connected to network 30 and stores it in HDD 113, or that printing server 200 is able to write a pull printing program in HDD 113 so that the pull printing program stored in HDD 113 is loaded into RAM 112 and executed at CPU 111. The program, as used herein, not only includes a program directly executable by CPU 111, but also a source program, a compressed program, an encoded program, and the like.

Facsimile portion 27 is connected to a PSTN 13 in order to transmit facsimile data to PSTN 13 or receive facsimile data from PSTN 13. Facsimile portion 27 stores received facsimile data in HDD 113 while at the same time converting the facsimile data into printing data that can be printed on image forming portion 24 and transmitting the printing data thereto. Then, image forming portion 24 prints the facsimile data received by facsimile portion 27 onto a sheet. Facsimile portion 27 also converts data stored in HDD 113 into facsimile data and transmits it to the facsimile apparatus connected to PSTN 13.

Figure 4:
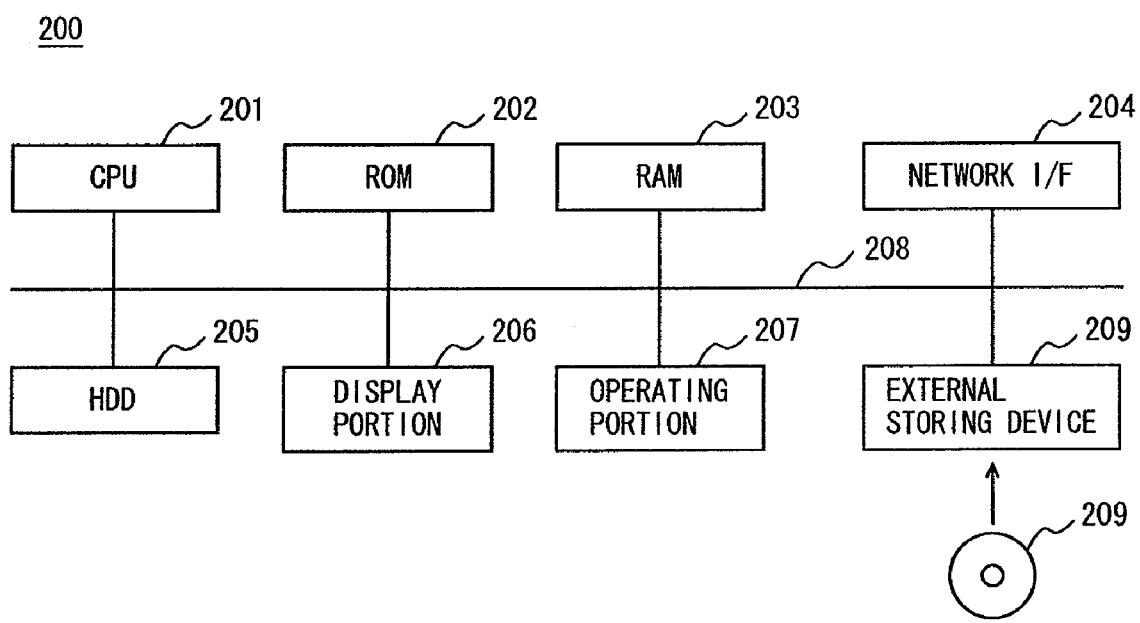
FIG. 4 is a block diagram showing an example of the hardware structure of a printing server.

FIG. 4 is a block diagram showing an example of the hardware structure of the printing server. Referring to FIG. 4, printing server 200 includes a CPU 201 that generally controls printing server 200, a ROM 202 that stores programs and the like executed by CPU 201, a RAM 203 used as a working area for CPU 201, a network I/F 202 that connects printing server 200 to a network, an HDD 205 serving as a mass storage, a display portion 206, an operating portion 207 that accepts input users' operations, and an external storing device 209, all of which are connected to a bus 208.

To external storing device 209, a CD-ROM (Compact Disc-ROM) 209A storing a printing data transmission program is mounted. CPU 201 loads the printing data transmission program stored in CD-ROM 209A into RAM 203 through external storing device 209 and executes the program. The recording media that stores the printing data transmission program is not limited to CD-ROM 209A and can also be media such as a flexible disk, a cassette tape, an optical disk (MO (Magnetic Optical Disc)/MD (Mini Disc)/DVD (Digital Versatile Disc)), an IC card, an optical card, and a semiconductor memory such as a masked ROM, an EPROM, an EEPROM. It is possible to load a printing data transmission program stored in HDD 205 into RAM 203 and execute the program. In this case, printing server 200 may download the printing data transmission program from another computer connected to network 30 and store the printing data transmission program in HDD 205. The program, as used herein, not only includes a program directly executable by CPU 201, but also a source program, a compressed program, an encoded program, and the like.

Figure 5:
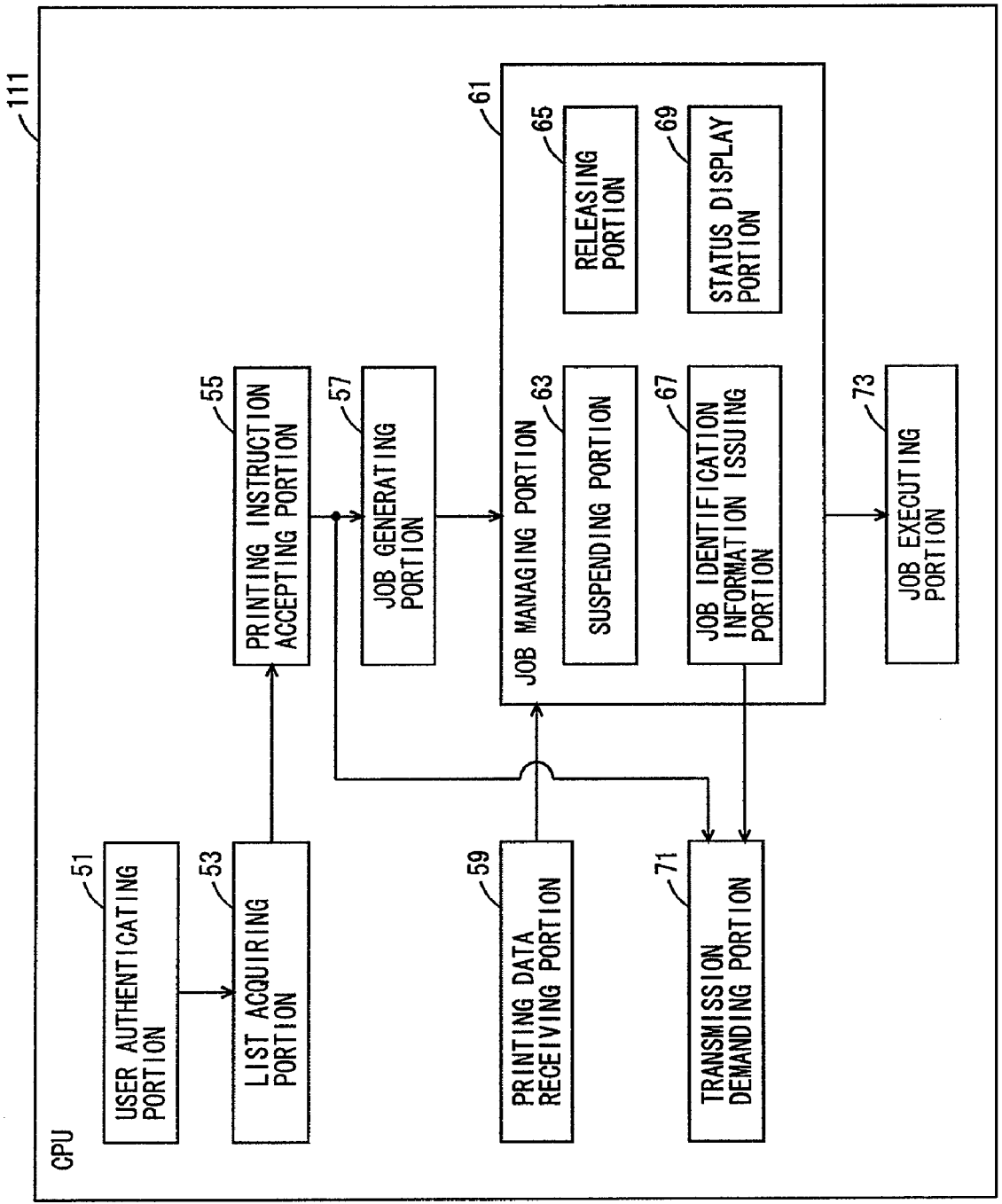
FIG. 5 is a functional block diagram showing an example of the functions of the CPU of the MFP.

FIG. 5 is a functional block diagram showing an example of the functions of the CPU of the MFP. Referring to FIG. 5, CPU 111 of MFP 1 includes a user authenticating portion 51 to authenticate a user, a list acquiring portion 53 to acquire a list of printing data, a printing instruction accepting portion 55 to accept a printing instruction, a job generating portion 57 to generate a job, a printing data receiving portion 59 to receive printing data transmitted from printing server 200, a job managing portion 61 to manage the generated job, and an executing portion 73 to execute the job.

User authenticating portion 51 authenticates the user who operates MFP 1. Specifically, when the user inputs authentication information to operating portion 115, user authenticating portion 51 accepts the authentication information from operating portion 115 and transmits the accepted authentication information to authentication server 300 through data communication control portion 116 in order to cause authentication server 300 to carry out an authentication. Upon receipt of the authentication information, authentication server 300 compares the authentication information with user data stored in advance. When the authentication information and the user data agree, authentication server 300 transmits in return an authentication result indicating a successful authentication, while when they do not agree, authentication server 300 transmits in return an authentication result indicating a failed authentication. The user data contains a password and user identification information for identifying a user.

When data communication control portion 116 receives an authentication result from authentication server 300, user authenticating portion 51 accepts the authentication result. When the authentication result indicates a successful authentication, user authenticating portion 51 outputs the user identification information to list acquiring portion 53, while when the authentication result indicates a failed authentication, user authenticating portion 51 displays an error message on display portion 114. The authentication information contains a user ID and a password. The user ID is user identification information for identifying a user and predetermined on a user basis. When user authenticating portion 51 receives an authentication result indicating a successful authentication, an operation input to operating portion 115 from then on will be accepted as an operation by the authenticated user.

The authentication information may be bio-information such as the user's fingerprints, vein patterns, and iris. In this case, a reading device for reading the bio-information is connected to MFP 1, and the user data stored in authentication server 200 contains the user identification information and the bio-information. To user authenticating portion 51, the bio-information read by the reading device is input. User authenticating portion 51 transmits the input authentication information to authentication server 300 through data communication control portion 116 in order to cause authentication server 300 to carry out an authentication. Upon receipt of the authentication information, authentication server 300 compares the authentication information with bio-information of the user data stored in advance. When the authentication information and the bio-information agree, authentication server 300 transmits in return an authentication result indicating a successful authentication, while when they do not agree, authentication server 300 transmits in return an authentication result indicating a failed authentication.

Upon input of the user identification information from user authenticating portion 51, list acquiring portion 53 transmits a list transmission demand to printing server 200 through data communication control portion 116. The list transmission demand contains the user identification information input from user authenticating portion 51. Upon receipt of the list transmission demand, printing server 200 extracts, among the pairs of printing data and user identification information stored in HDD 205, a pair that contains the user identification information contained in the list transmission demand. Printing server 200 then generates a list that at least contains printing data identification information of the printing data in the extracted pair and transmits it in return. The list that printing server 200 transmits contains printing data identification information of the printing data associated with the user identification information contained in the list transmission demand, and therefore contains the user identification information of the printing data associated with the user authenticated by user authenticating portion 51. The list contains, in addition to the printing data identification information, the time of storing the printing data in printing server 200 and apparatus identification information about any of PCs 400 to 402 that has transmitted the printing data. When data communication control portion 116 receives the list from printing server 200, list acquiring portion 53 accepts the list from data communication control portion 116. List acquiring portion 53 displays a list screen containing the acquired list on display portion 114.

FIG. 6 is a diagram showing an example of the list screen. Referring to FIG. 6, the list screen contains a plurality of pieces of printing information including an item for registration time, an item for registration source, and an item for document name. The item for registration time is where the time of storing the printing data in printing server 200 is set, the item for registration source is where apparatus identification information about any of PCs 400 to 402 that has transmitted the printing data is set, and the item for document name is where the printing data identification information is set.

Referring back to FIG. 5, printing instruction accepting portion 55 accepts an instruction for the printing data identification information among the list displayed on display portion 114. When the user inputs to operating portion 115 an operation of selecting one piece of printing data identification information contained in the list, printing instruction accepting portion 55 accepts the piece of printing data identification information selected by operating portion 115. Printing instruction accepting portion 55 outputs the accepted printing data identification information to job generating portion 57 and a transmission demanding portion 71. As the printing data identification information, one piece of printing data identification information or two or more pieces of printing data identification information may be accepted by printing instruction accepting portion 55. When two or more pieces of printing data identification information are accepted, the same processing as one executed based on one piece of printing data identification information, described later, is executed. For simplicity of explanation, description will be made of the example where one piece of printing data identification information is accepted.

Upon input of the printing data identification information from printing instruction accepting portion 55, job generating portion 57 generates a reserved job serving as a tentative job to print the printing data identified by the printing data identification information and outputs the generated reserved job to job managing portion 61. When accepting input of a plurality of pieces of printing data identification information from printing instruction accepting portion 55, job generating portion 57 generates a plurality of reserved jobs corresponding to the plurality of pieces of printing data identification information. That is, a single reserved job is generated for a single piece of printing data identification information. Job generating portion 57 also generates a job based on an operation that the user inputs to operating portion 115. For example, job generating portion 57 generates a copying job based on a copying operation that the user inputs to operating portion 115, and outputs the generated job to job managing portion 61.

Job managing portion 61 manages jobs to be executed by executing portion 73 with the use of a job list and causes executing portion 73 to sequentially execute the jobs registered in the job list. Upon input of a job including a reserved job from job generating portion 57, job managing portion 61 registers the job in the job list. Specifically, job managing portion 61 generates a job record corresponding to the job and stores the job record by adding it to the job list. The job list will be described below. The job list is stored in HDD 113 or RAM 112.

FIG. 7 is a diagram showing an example of the job list. Referring to FIG. 7, the job list includes a job record for each of the registered jobs, the job record including an item for execution order, an item for job identification information, an item for type, an item for registration source, and an item for status. The item for execution order indicates the order of execution of the jobs and sets consecutive numbers in accordance of the order of registration of the jobs. The item for job identification information is where job identification information for identifying the jobs is set. The job identification information is issued by a job identification information issuing portion 67, described later. The item for type indicates job type and is where, in this example, either "Normal" or "Reserved" is set. When a job is a reserved job, "Reserved" is set while when a job is not a reserved job, "Normal" is set. The item for registration source is where user identification information for identifying the user who has instructed execution of a job is set. The item for status is where job status is set. In this example, the job status includes "Executing" indicating that the job is being executed, "Waiting for printing" indicating that the job is waiting for its turn for image formation by image forming portion 24, "Waiting for transmission" indicating that the job is waiting for its turn for data transmission by data communication control portion 116, and "Holding" indicating that the job is being prohibited from being executed.

The job record may contain apparatus identification information for identifying printing server 200, data identification information for identifying the printing data, and apparatus identification information for identifying MFP 1, which stores the job list, though they are not mentioned above.

Referring back to FIG. 5, job managing portion 61 includes a suspending portion 63 to temporarily prohibit job executing portion 73 from executing the reserved job, a releasing portion 65 to release the prohibition of execution of the reserved job, a job identification information issuing portion 67 to issue job identification information for identifying the job, and a status display portion 69 to display the status of the job. Upon input of a job from job generating portion 57, job identification information issuing portion 67 issues job identification information for identifying this job. Consecutive numbers may be used for the job identification information issued by job identification information issuing portion 67. Random numbers may be used for the job identification information. Job identification information issuing portion 67 outputs the job identification information issued for the reserved job to transmission demanding portion 71.

Suspending portion 63 sets the item for status to "Holding" in the job record corresponding to the reserved job stored in the job list. This is because at the time when the reserved job is generated, printing data corresponding to the reserved job is not stored in HDD 113 of MFP 1 yet and thus the reserved job cannot be executed, thereby making it necessary to prohibit job executing portion 73 from executing the reserved job until the printing data is received by printing data receiving portion 59 and stored in HDD 113.

Upon input of the job identification information, transmission demanding portion 71 transmits to printing server 200 a printing data transmission demand for demanding transmission of the printing data, the demand containing the job identification information and printing data identification information accepted by printing instruction accepting portion 55, and receives the printing data transmitted from printing server 200. The printing data identification information accepted by printing instruction accepting portion 55 is printing data identification information for identifying the printing data that is targeted for execution by the reserved job specified by the job identification information.

Upon receipt of the printing data transmission demand, printing server 200 extracts printing data, from among the printing data stored in HDD 205, that is specified by the printing data identification information contained in the printing data transmission demand, and transmits in return the extracted printing data to MFP 1, which has transmitted the printing data transmission demand, together with the job identification information contained in the printing data transmission demand. Since printing data 200 transmits the job identification information contained in the printing data transmission demand together with the printing data, MFP 1, which receives the printing data, is able to associate the printing data with the reserved job.

When data communication control portion 116 receives the printing data and the job identification information from printing server 200, printing data receiving portion 59 accepts them from data communication control portion 116. Printing data receiving portion 59 outputs the accepted printing data and job identification information to job managing portion 61.

Job managing portion 61 stores the printing data input from printing data receiving portion 59 in a predetermined area of HDD 113. When the printing data is stored in HDD 113, releasing portion 65 judges whether there is a job record, among job records contained in the job list, that contains the job identification information input from printing data receiving portion 59 together with the printing data. When such a job record exists, job managing portion 61 changes the item for status of this job record to "Waiting for printing." This enables job executing portion 73 to execute the reserved job that suspending portion 63 prohibited job executing portion 73 from executing.

Job managing portion 61 causes executing portion 73 to execute a job specified by job identification information set in the item for job identification information of a job record that is first in the execution order of the job list on condition that the item for status of the job record is not set at "Holding," and sets the item for status of the job record at "Executing." When the item for status of the job specified by job identification information set in the item for the job identification information of the job record that is first in the execution order of the job list is set at "Holding," job managing portion 61 causes executing portion 73 to execute a job of a job record, prior to the job of the job record set at "Holding" in the item for status, that is second or later in the execution order and is not set at "Holding" in the item for status, and sets the item for status of the job record at "Executing." In this case, the execution order changes. The reason for not executing the job set at "Holding" in the item for status of the job record is that executing portion 73 is intended to be kept from executing the reserved job that is prohibited from being executed by suspending portion 63 until releasing portion 65 releases the prohibition.

Figure 8:
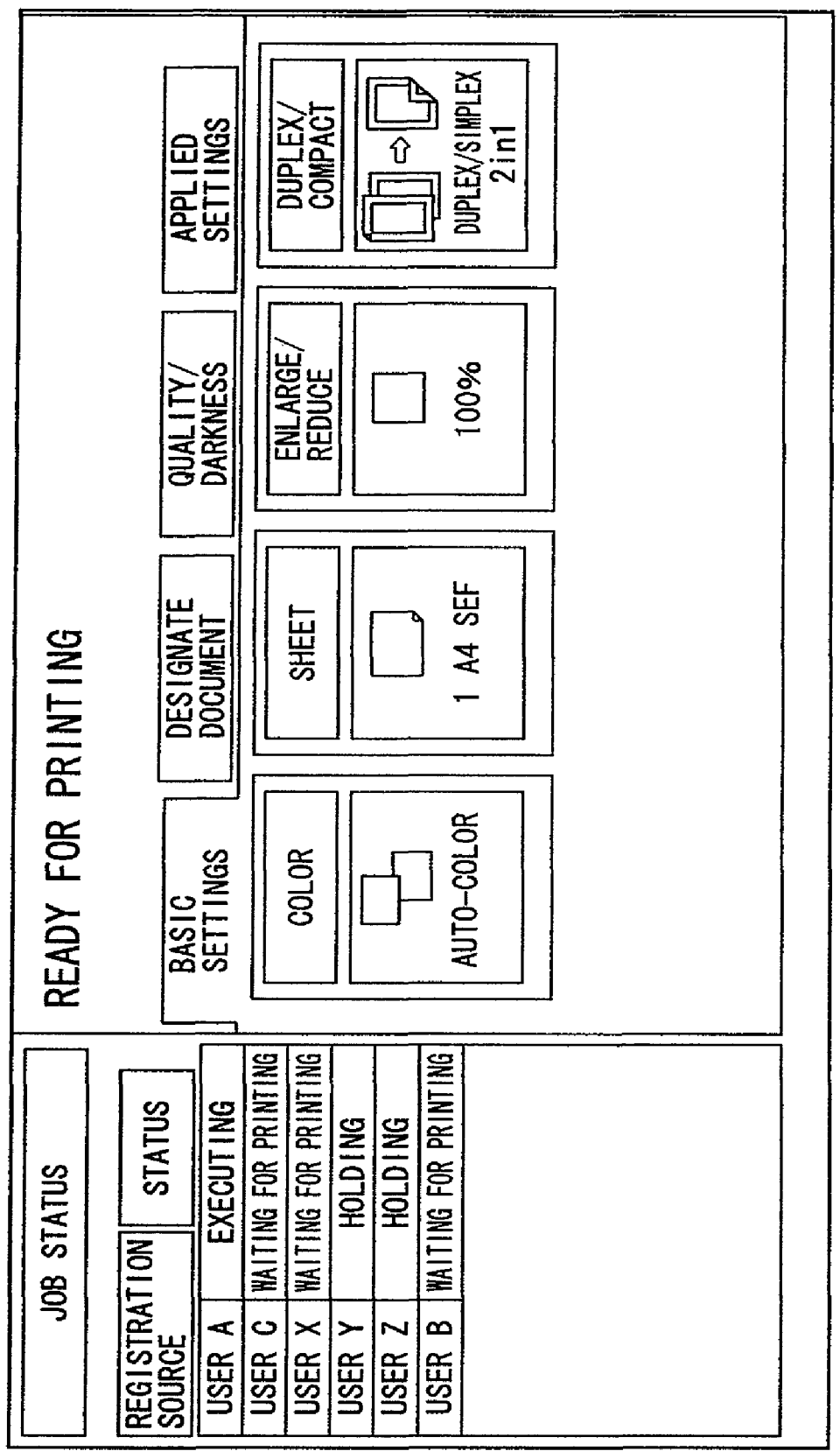
FIG. 8 is a diagram showing an example of a status display screen.

When the user inputs an operation for causing operating portion 115 to display the status of the job, status display portion 69 displays a status display screen including a part of the job list on display portion 114. FIG. 8 is a diagram showing an example of the status display screen. Referring to FIG. 8, the status display screen displays the item of registration source and the item for status of a printing job-related job record among the job records included in the job list. The user is able to know the status of the printing job registered in MFP 1 by looking at the status display screen. The reason for not displaying a job record of a data transmission job is that the time for executing the data transmission job is short.

Figure 9:
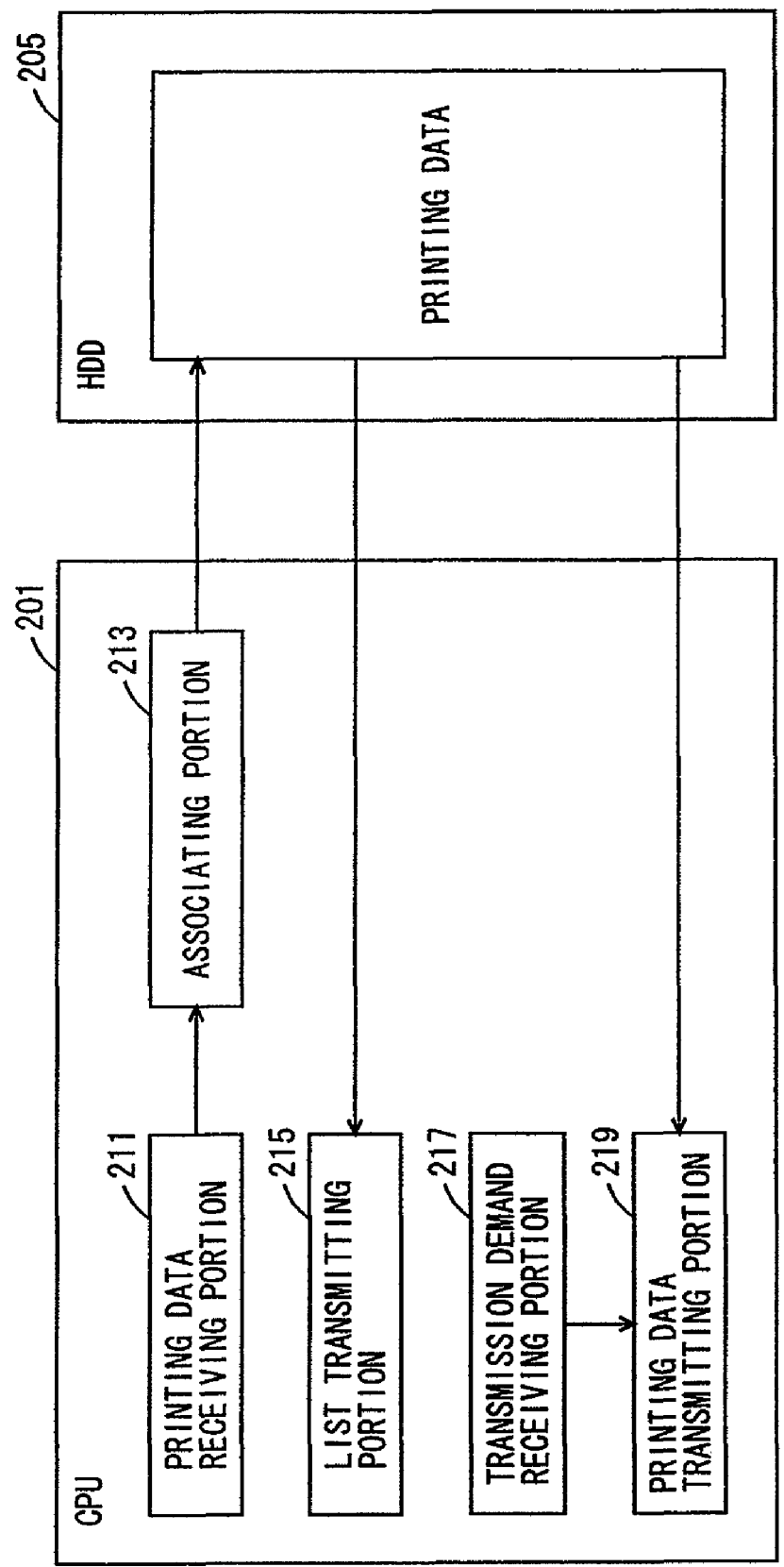
FIG. 9 is a functional block diagram schematically showing the functions of a CPU provided in the printing server.

FIG. 9 is a functional block diagram schematically showing the functions of CPU provided in the printing server. Referring to FIG. 9, CPU 201 of printing server 200 includes a printing data receiving portion 211 to receive printing data from any of PCs 400 to 402, an associating portion 213 to associate the printing data with user identification information that is received together with the printing data, a list transmitting portion 215 to transmit a list of printing data, a transmission demand receiving portion 217 to receive a printing data transmission demand from any of MFPs 1 to 3, and a printing data transmitting portion 219 to transmit the printing data in accordance with the received printing data transmission demand.

Printing data receiving portion 211 controls a network I/F 204 to receive printing data and user identification information from any of PCs 400 to 402. Printing data receiving portion 211 outputs the pair of the received printing data and user identification information to associating portion 213. Associating portion 213 associates the received printing data and user identification information with each other and stores them in a predetermined area of HDD 205.

When network I/F 204 receives a list transmission demand from any of MFPs 1 to 3, list transmitting portion 215 extracts, from among the pairs of printing data and user identification information stored in HDD 205, a pair that contains the user identification information contained in the list transmission demand, and generates a list that at least contains the printing data identification information of the printing data of the extracted pair. Then list transmitting portion 215 transmits, through network I/F 204, the generated list to the MFP, among MFPs 1 to 3, that has transmitted the list transmission demand.

When network I/F 204 receives a printing data transmission demand from any of MFPs 1 to 3, transmission demand receiving portion 217 outputs the received printing data transmission demand to printing data transmitting portion 219. Printing data transmitting portion 219 extracts printing data, from among the printing data stored in HDD 205, that is specified by the printing data identification information contained in the printing data transmission demand, and transmits, through network I/F 204, the extracted printing data and the job identification information contained in the printing data transmission demand to the MFP, among the MFPs 1 to 3, that has transmitted the printing data transmission demand.

Figure 10:
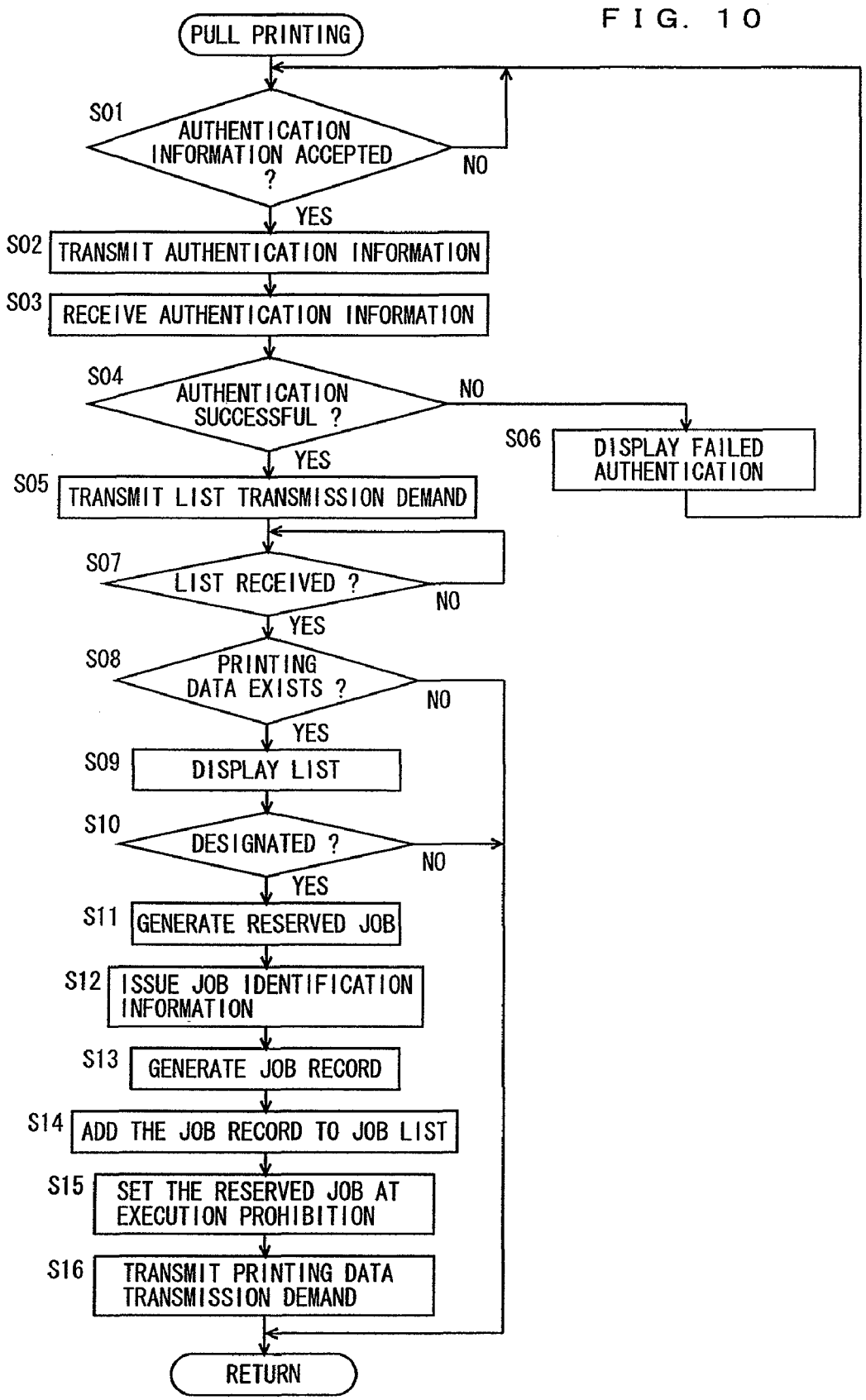
FIG. 10 is a flowchart showing an example of the flow of pull printing processing.

FIG. 10 is a flowchart showing an example of the flow of pull printing processing. The pull printing processing is executed by CPU 111 of MFP 1 when CPU 111 executes a pull printing program. Referring to FIG. 10, CPU 111 judges whether authentication information is accepted (step S01). The authentication information includes user identification information and a password in this example. When the user inputs the authentication information to operating portion 115, CPU 111 accepts the input authentication information. CPU 111 turns into a stand-by state until acceptance of the authentication information ("NO" in step S01), and upon acceptance of the authentication information, CPU 111 proceeds the processing to step S02. That is, the processing after step S02 is executed on condition that the authentication information is accepted.

In step S02, CPU 111 transmits the authentication information to authentication server 300. Upon receipt of the authentication information, authentication server 300 carries out an authentication based on the received authentication information. When the authentication is successful, authentication server 300 transmits in return an authentication result indicating a successful authentication, while when the authentication fails, authentication server 300 transmits in return an authentication result indicating a failed authentication. The authentication involves judgment as to whether the received authentication information agrees to user data stored in advance. In step S03, CPU 111 receives the authentication result that authentication server 300 transmits in return.

Then, CPU 111 judges whether the authentication result indicates a successful authentication (step S04). When the authentication result indicates a successful authentication, CPU 111 proceeds the processing to step S05, while otherwise proceeding the processing to step S06. In step S06, CPU 111 displays on display portion 114 a message informing a failed authentication and returns the processing to step S01. This is for the purpose of printing the printing data stored in printing server 200 only in the case where the user who is operating MFP 1 is authenticated by authentication server 300 and confirmed to be the genuine user.

In step S05, CPU 111 transmits a list transmission demand to printing server 200. The list transmission demand includes the user identification information contained in the authentication information accepted in step S01. This is for the purpose of acquiring a list of printing data associated with the authenticated user.

Figure 11:
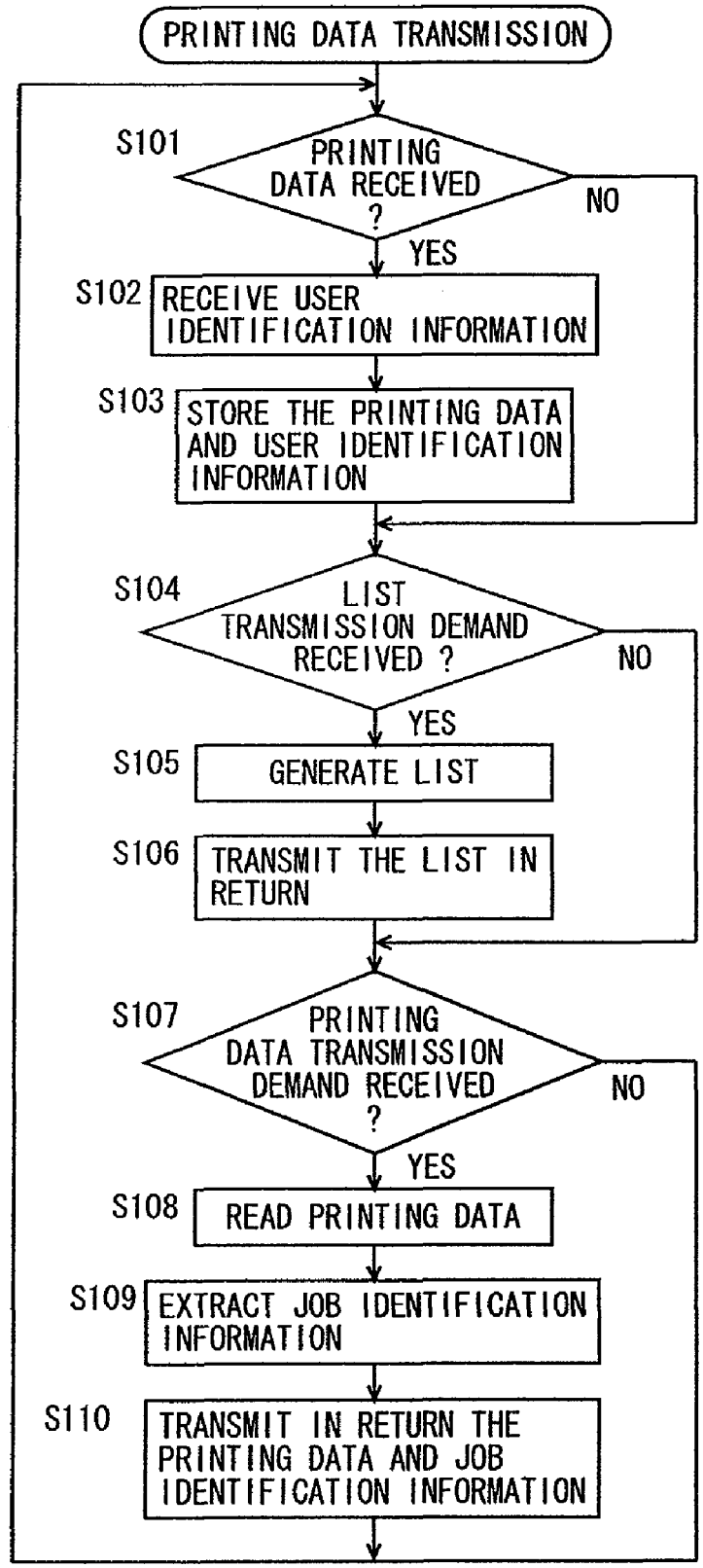
FIG. 11 is a flowchart showing an example of the flow of printing data transmission processing.

Description will be made of processing that CPU 201 of printing server 200 executes. FIG. 11 is a flowchart showing an example of the flow of printing data transmission processing. The printing data transmission processing is executed by CPU 201 of printing server 200 when CPU 201 executes a printing data transmission program.

Referring to FIG. 11, CPU 201 of printing server 200 judges whether printing data is received from any of PCs 400 to 402 (step S101). When the printing data is received, CPU 201 proceeds the processing to step S102, while otherwise proceeding the processing to step S104. In step S102, CPU 201 receives user identification information from the PC, among PCs 400 to 402, that has transmitted the printing data. Then CPU 201 associates the printing data and the user identification information with each other and stores them in HDD 205 (step S103). Then CPU 201 proceeds the processing to step S104.

In step S104, CPU 201 judges whether a list transmission demand is received from any of MFPs 1 to 3. When the list transmission demand is received, CPU 201 proceeds the processing to step S105, while otherwise proceeding the processing to step S107. In step S105, CPU 201 generates a list. Specifically, CPU 201 extracts printing data, from among the printing data stored in HDD 205, that is associated with the user identification information contained in the list transmission demand received in step S104. When a plurality of pieces of printing data are associated with the user identification information contained in the list transmission demand, CPU 201 extracts the plurality of printing data. Then CPU 201 generates a list of printing data identification information of the extracted printing data. Then CPU 201 transmits in return the generated list to the MFP, among MFPs 1 to 3, that has transmitted the list transmission demand (step S106), and proceeds the processing to step S107.

Referring back to FIG. 10, in step S07, CPU 111 of MFP 1 turns into a stand-by state until receipt of a list from printing server 200 ("NO" in step S07), and upon receipt of the list ("YES" in step S07), CPU 111 proceeds the processing to step S08. In step S08, CPU 111 judges whether printing data exists in printing server 200. Specifically, CPU 111 judges whether the list contains at least one piece of printing data identification information. When printing data exists, CPU 111 proceeds the processing to step S09, while otherwise ending the processing. This is because when printing server 200 stores no printing data targeted for processing, there is no need for processing.

In step S09, CPU 111 displays the list received in step S07 on display portion 114. This results in the list shown in FIG. 6, and the user operating MFP 1 is able to make an instruction to print the printing data. In step S10, CPU 111 judges whether printing data is designated. Specifically, CPU 111 judges whether the user inputs an operation to designate at least one of the printing data identification information contained in the list. When printing data identification information is designated, CPU 111 proceeds the processing to step S11, while otherwise ending the processing. This is because there is no need for printing when the user has no intention for printing. When a plurality of pieces of printing data identification information are designated, CPU 111 executes the processing from steps S11 to S16 for each of the pieces of printing data identification information.

In step S11, CPU 111 generates a reserved job. The reserved job is a job to print the printing data designated in step S10. If necessary, CPU 111 accepts setting of printing conditions. Then CPU 111 issues job identification information. The job identification information may be any information insofar as the reserved job can be identified with it. In this example, each generated job is allotted one of consecutive numbers. Then CPU 111 generates a job record (step S13). Specifically, CPU 111 sets the item for execution order at a number next to the last job record in the execution order contained in the job list; sets the item for job identification information at the job identification information issued in step S12; sets the item for type at "Reserved"; and sets the item of registration source at the user identification information accepted in step S01.

In the next step S14, CPU 111 stores the generated job record by adding it to the job list stored in the HDD. Then CPU 111 sets the reserved job to be prohibited from being executed (step S15). Specifically, CPU 111 sets the item for status of the job record added to the job list in step S14 at "Holding." Then CPU 111 transmits a printing data transmission demand to printing server 200 and ends the processing. The printing data transmission demand includes the printing data identification information designated in step S10 and the job identification information issued in step S12. In this example, CPU 111 generates a PJL that describes the job identification information and a command to print the printing data of the printing data identification information, and transmits the generated PJL to printing server 200.

Referring again to FIG. 11, in step S107, CPU 201 of printing server 200 judges whether printing data transmission demand is received from any of MFPs 1 to 3. When the printing data transmission demand is received, CPU 201 proceeds the processing to step S108, while otherwise returning the processing to step S101. In step S108, CPU 201 reads from HDD 205 printing data identified by the printing data identification information contained in the received printing data transmission demand.

In the next step S109, CPU 201 extracts, from the printing data transmission demand, job identification information contained therein. Then CPU 201 transmits in return the extracted job identification information and the printing data read in step S108 to the MFP, among MFPs 1 to 3, that has transmitted the printing data transmission demand, and returns the processing to step S101.

Figure 12:
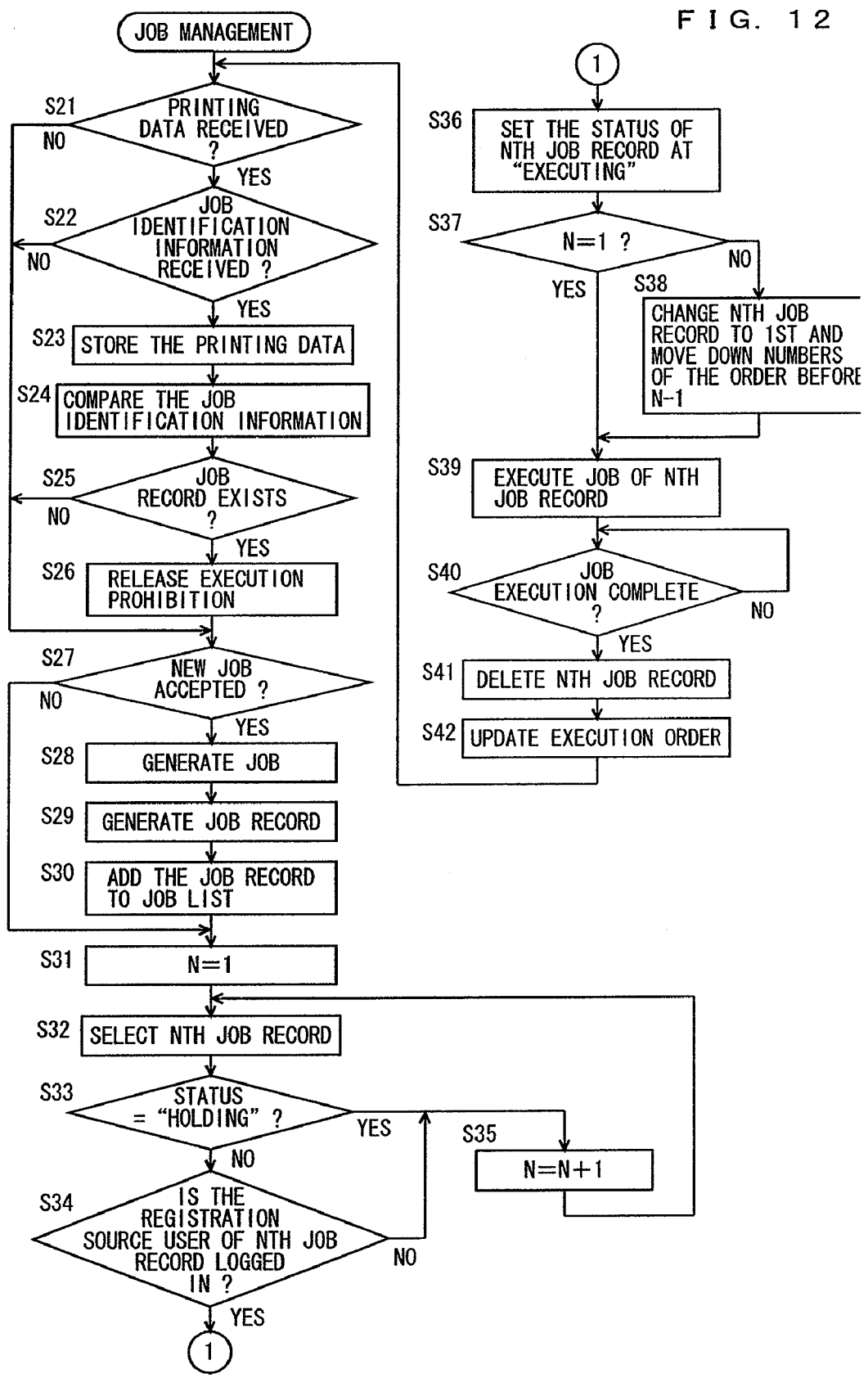
FIG. 12 is a flowchart showing an example of the flow of job management processing.

FIG. 12 is a flowchart showing an example of the flow of job management processing. The job management processing is executed by CPU 111 of MFP 1 when CPU 111 executes a job management program. Referring to FIG. 12, CPU 111 judges whether printing data is received from printing server 200 (step S21). When the printing data is received, CPU 111 proceeds the processing to step S22, while otherwise proceeding the processing to step S27. In step S22, CPU 111 judges whether job identification information is received together with the received printing data. When the job identification information is received, CPU 111 proceeds the processing to step S23, while otherwise proceeding the processing to step S27. This is because when the printing data is not with job identification information at the time of receipt from printing server 200, the received printing data differs from the printing data transmitted by printing server 200 in response to the printing data transmission demand transmitted to printing server 200 in step S16 shown in FIG. 16.

In step S23, CPU 111 stores the printing data received in step S21 in a predetermined area of HDD 113. In the next step S24, CPU 111 carries out a comparison using the job identification information. Specifically, CPU 111 compares the job identification information received in step S22 with the job identification information set in the item for job identification information of the job records contained in the job list. Then CPU 111 judges whether the job records contained in the job list include a job record that has, in the item for job identification information, the same job identification information as the job identification information received in step S22. When such a job record exists in the job list, CPU 111 extracts the job record and proceeds the processing to step S26, while otherwise proceeding the processing to step S27. The job record extracted in step S25 is a job record of the reserved job.

In step S26, CPU 111 releases the execution prohibition of the reserved job. Specifically, CPU 111 changes the item for status of the job record extracted in step S25 from "Holding" to "Waiting for printing."

In step S27, CPU 111 judges whether a new job is accepted. When the new job is accepted, CPU 111 proceeds the processing to step S28, while otherwise proceeding the processing to step S31. In step S28, CPU 111 generates the accepted new job. For example, when the user inputs an operation for instructing copying to operating portion 115, CPU 111 generates a job to execute copying processing. Then CPU 111 generates a job record corresponding to the new job (step S29). In this case, specifically, CPU 111 sets the item for execution order at a number next to the last job record in the execution order contained in the job list; sets the item for job identification information at job identification information allotted to the job; sets the item for type at "Waiting for printing"; and sets the item for registration source at the log-in user, which is, in this example, the user identification information of the user who has input the copying processing. Next, CPU 111 stores the generated job record by adding it to the job list (step S30).

In step S31, CPU 111 sets a variable N at "1." Variable N indicates the execution order of the job record targeted for processing. In the next step S32, CPU 111 selects the Nth job record as the target for processing. Specifically, CPU 111 selects a job record that is set at "N" in the item for execution order. Then CPU 111 judges whether the item for status of the selected job record is set at "Holding" (step S33). When the job record is set at "Holding," CPU 111 proceeds the processing to step S35, while otherwise proceeding the processing to step S34. This is because a job set at "Holding" has no printing data targeted for processing and therefore is prohibited from being executed.

In step S34, CPU 111 judges whether the registered user of the Nth job record is logged in. Specifically, CPU 111 makes a judgment as to agreement between the user identification information of the authenticated logged-in user and the user identification information set in the item for registration source of the job record that is Nth in the execution order. When they agree, CPU 111 proceeds the processing to step S36, while when they do not agree, CPU 111 proceeds the processing to step S35. This enables the printing data to be printed only when the user authorized to print the printing data is logged in. When the user makes a printing instruction and then becomes logged out before printing, the job is kept registered in the job list, and when the user is logged in MFP 1 again, the job registered in the job list is executed immediately. This enables the user to make an efficient use of the time for waiting for the job to be executed.

In step S35, CPU 111 sets variable N at a value greater by 1 and proceeds the processing to step S32. This is for the purpose of making the next job record in the execution order the target for processing. Since a job that is later in execution order than a reserved job that is set at "Holding" in the item for status is executed prior to the reserved job, the jobs registered in the job list can be executed efficiently. Also, a job that is later in execution order than a job (including a reserved job) associated with a user (logged-out user) with invalid, unauthenticated user identification information set in the item for registration source is executed prior to the invalid job. This prevents a printed sheet from being had by others and confidential information from leaking.

In step S36, CPU 111 sets the item for status of the processing target job record that is Nth in the execution order at "Executing." In the next step S37, CPU 111 judges whether variable N is set at "1." When variable N is set at "1," CPU 111 proceeds the processing to step S39, while otherwise proceeding the processing to step S38. In step S38, CPU 111 changes the execution order of the Nth job record to 1st and moves down the numbers of the order before N−1. Specifically, CPU 111 changes the execution order of the job record that was Nth, i.e., the processing target, to 1st while at the same time changing the execution order of the job records that were 1st to (N−1)th respectively to 2nd to Nth.

In step S39, CPU 111 executes the job of the job record that is 1st in the execution order. CPU 111 turns into a stand-by state until the executed job ends ("NO" in step S40), and upon ending of the job ("YES" in step S40), CPU 111 proceeds the processing to step S41. In step S41, CPU 111 deletes the job record that is 1st in the execution order from the job list. In step S42, CPU 111 updates the execution order of the rest of the job records so that the order begins from 1. Then CPU 111 returns the processing to step S21.

As has been described hereinbefore, at MFP 1, when user authenticating portion 51 authenticates a user and printing instruction accepting portion 55 accepts an instruction to print printing data, then job generating portion 57 generates a reserved job to form an image of the printing data associated with the authenticated user; job identification information issuing portion 67 issues job identification information for identifying the generated reserved job; and transmission demanding portion 71 transmits to printing server 200 a printing data transmission demand that demands transmission of the printing data associated with the authenticated user and contains the job identification information. Then, when suspending portion 63 temporarily prohibits the reserved job from being executed, and printing data receiving portion 59 receives, in response to the transmission of the printing data transmission demand, printing data from printing server 200 together with the same job identification information as that of the reserved job, then releasing portion 65 releases the prohibition of execution of the reserved job. Thus, a reserved job to form an image of printing data associated with an authenticated user is generated, and job identification information issued for the reserved job is received together with the printing data, thereby eliminating the need for confirming the authorization to print the printing data received from printing server 200. Also, since the reserved job, which is generated on condition that the user is authenticated, is executed upon receipt of the printing data, the printing data stored in printing server 200 can be printed by a simple method. As a result, the number of times of authentication is reduced when the printing data stored in printing server 200 is printed.

Also, executing portion 73 does not execute a reserved job that is prohibited from being executed by suspending portion 63, and instead, executes another job prior to the prohibited job, resulting in efficient execution of jobs.

Also, for a user identified by user identification information associated with job identification information received together with printing data from printing server 200, executing portion 73 executes a reserved job specified by the job identification information on condition that an authentication by user authenticating portion 51 is valid. Thus, the printing data is printed during the time when the user is logged in MFP 1, while when, for example, the user becomes logged out after making a printing instruction, the printing data is not printed. This prevents confidential information from leaking to other users. Further, the printing data is printed when the user is logged in again after making a printing instruction and becoming logged out, thereby realizing efficient use of the time between the printing instruction and printing.

While in the above embodiment description has been made of a printing system, it will be readily appreciated that the present invention can also be taken as a pull printing method or a pull printing program for causing a computer to execute the processing shown in FIG. 10, FIG. 11, and FIG. 12.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing system including an image forming apparatus and a printing server, wherein:
   said image forming apparatus comprises:
   a printing data receiving portion to receive printing data from said printing server;
   a job executing portion to execute a job to form an image of said received printing data;
   a user authenticating portion to authenticate a user;
   a job generating portion to generate a reserved job to form an image of printing data associated with said authenticated user;
   a suspending portion to temporarily prohibit said job executing portion from executing said reserved job;
   a job identification information issuing portion to issue job identification information for identifying said generated reserved job;
   a transmission demanding portion to transmit to said printing server a printing data transmission demand for demanding transmission of said printing data associated with said authenticated user, said printing data transmission demand containing said job identification information; and
   a releasing portion to release the prohibition of execution of said reserved job by said job executing portion when said printing data received from said printing server in response to transmission of said printing data transmission demand is received together with the same job identification information as said reserved job; and
   said printing server comprises:
   a printing data storing portion to, upon receipt of said printing data and user identification information for identifying said user, store said printing data in association with said user identification information; and
   a printing data transmitting portion to, upon receipt of said printing data transmission demand from said image forming apparatus, transmit to said image forming apparatus a piece of printing data among stored printing data, said piece of printing data being associated with printing data identification information contained in said printing data transmission demand and transmitted together with said job identification information contained in said printing data transmission demand.

2. The printing system according to claim 1, wherein said job executing portion executes another job first without executing said reserved job prohibited from being executed by said suspending portion.

3. The printing system according to claim 1, wherein said job executing portion executes a reserved job identified by job identification information on condition that said user authenticating, portion validly authenticates a user identified by user identification information with which said job identification information received from said printing server together with said printing data is associated.

4. The printing system according to claim 1, wherein:
   said image forming apparatus further comprises: an acquiring portion to transmit to said printing server a list transmission demand containing user identification information for identifying said authenticated user and to acquire from said printing server printing data identification information for identifying printing data associated with said authenticated user; and a printing instruction accepting portion to accept a designation of said acquired printing data identification information;
   said job generating portion generates said reserved job upon acceptance of said designation of said acquired printing data identification information by said printing instruction accepting portion; and
   said printing server further comprises a list transmitting portion to, upon receipt of said list transmission demand from said image forming apparatus, transmit to said image forming apparatus printing data identification information for identifying printing data associated with the same user identification information as said user identification information contained in said received list transmission demand.

5. An image forming apparatus comprising:
a printing data receiving portion to receive printing data from a server;
a job executing portion to execute a job to form an image of said received printing data;
a user authenticating portion to authenticate a user;
a job generating portion to generate a reserved job to form an image of printing data associated with said authenticated user;
a suspending portion to temporarily prohibit said job executing portion from executing said reserved job;
a job identification information issuing portion to issue job identification information for identifying said generated reserved job;
a transmission demanding portion to transmit to said server a printing data transmission demand for demanding transmission of said printing data associated with said authenticated user, said printing data transmission demand containing said job identification information; and
a releasing portion to release the prohibition of execution of said reserved job by said job executing portion when said printing data received from said server in response to transmission of said printing data transmission demand is received together with the same job identification information as said reserved job.

6. The image forming apparatus according to claim 5, wherein said job executing portion executes another job first without executing said reserved job prohibited from being executed by said suspending portion.

7. The image forming apparatus according to claim 5, wherein said job executing portion executes a reserved job identified by job identification information on condition that said user authenticating portion validly authenticates a user identified by user identification information with which said job identification information received from said server together with said printing data is associated.

8. A pull printing method comprising:
receiving printing data from a server;
authenticating a user;
generating a reserved job to form an image of printing data associated with said authenticated user;
temporarily prohibiting said reserved job from being executed;
issuing job identification information for identifying said generated reserved job;
transmitting to said server a printing data transmission demand for demanding transmission of said printing data associated with said authenticated user, said printing data transmission demand containing said job identification information; and
releasing the prohibition of execution of said reserved job temporarily prohibited from being executed when said printing data received from said server in response to transmission of said printing data transmission demand is received together with the same job identification information as said reserved job.

9. The pull printing method according to claim 8, further comprising the step of executing another job first without executing said reserved job prohibited from being executed by said suspending step.

10. The pull printing method according to claim 8, further comprising the step of executing a reserved job identified by job identification information on condition that said user authenticating step validly authenticates a user identified by user identification information with which said job identification information received from said server together with said printing data is associated.

11. A pull printing program embodied on a non-transitory computer readable medium, the pull printing program causing a computer to execute steps comprising:
receiving printing data from a server;
authenticating a user;
generating a reserved job to form an image of printing data associated with said authenticated user;
temporarily prohibiting said reserved job from being executed;
issuing job identification information for identifying said generated reserved job;
transmitting to said server a printing data transmission demand for demanding transmission of said printing data associated with said authenticated user, said printing data transmission demand containing said job identification information; and
releasing the prohibition of execution of said reserved job temporarily prohibited from being executed when said printing data received from said server in response to transmission of said printing data transmission demand is received together with the same job identification information as said reserved job.

12. The pull printing program embodied on a non-transitory computer readable medium according to claim 11, further causing the computer to execute the step of executing another job first without executing said reserved job prohibited from being executed by said suspending step.

13. The pull printing program embodied on a non-transitory computer readable medium according to claim 11, further causing the computer to execute the step of executing a reserved job identified by job identification information on condition that said user authenticating step validly authenticates a user identified by user identification information with which said job identification information received from said server together with said printing data is associated.

* * * * *